United States Patent Office 3,438,744
Patented Apr. 15, 1969

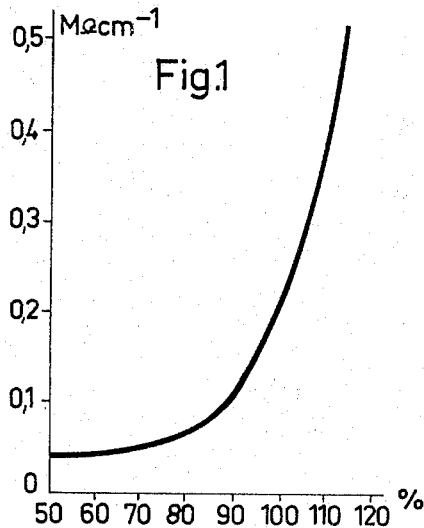
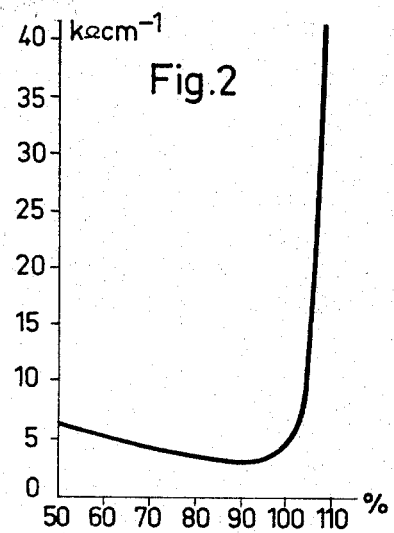
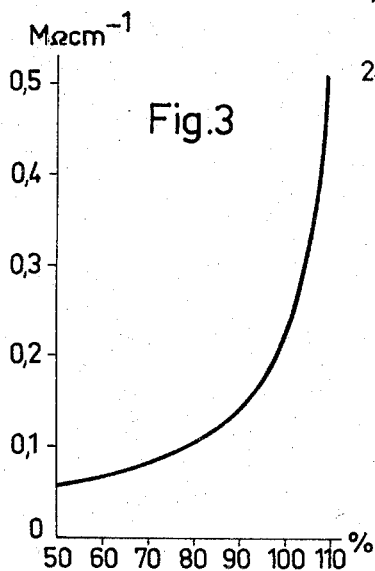
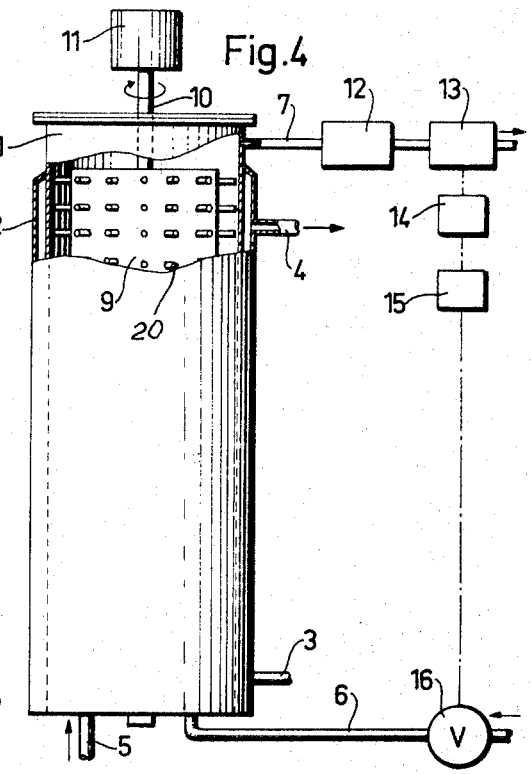

3,438,744
APPARATUS FOR SULPHONATING AND/OR SULPHATING ORGANIC COMPOUNDS CONTROLLING THE SULPHONATION OR SULPHATION DEGREE ACCORDING TO THE CONDUCTIVITY OF THE REACTION MIXTURE
Olof Steijner, Stenungsund, Sweden, assignor to Mo och Domsjö Aktiebolag, Ornskoldsvik, Sweden, a corporation of Sweden
Filed Feb. 1, 1965, Ser. No. 429,557
Claims priority, application Sweden, Feb. 4, 1964, 1,318/64
Int. Cl. C01b 17/96
U.S. Cl. 23—285         6 Claims

ABSTRACT OF THE DISCLOSURE

Apparatus is provided for use in the sulphonation and/or sulphation of organic compounds, having means for measuring the conductivity of the reaction mixture and controlling the rate of speed of the reactants to maintain a predetermined degree of sulphonation or sulphation.

---

This application contains common subject matter to that of copending application, Ser. No. 408,624, filed Nov. 3, 1964 in which application is a co-inventor.

Serial No. 408,624 describes a process and apparatus for the continuous sulphonation and/or sulphation of organic substances with sulphur trioxide gas in an inert gaseous medium. As is stated in that application, methods for continuous sulphonation and/or sulphation of organic substances with sulphur trioxide gas as the means of sulphonation and/or sulphation in an inert gaseous medium, where the reaction mixture is led between two cooled walls which are movably arranged in relation to each other, have been proposed earlier. According to one of these use was made of a reactor consisting of a fixed, cooled rotor, the shaft of which can be horizontally or vertically mounted and the speed of which is adjustable. The space formed between the rotor and the stator in the said device is utilized a said reaction zone, the volume of the space being adjustable so that the reaction product formed remains in the reactor only for a very short time, preferably less than one minute. The reactant mixture is preferably passed concurrently with the gas mixture containing sulphur trioxide. Although the method of utilizing devices of the type described above possesses considerable advantages in comparison with discontinuous methods, it has nevertheless been found that difficulties arise in maintaining constant conditions throughout the entire course of reaction. In some cases, despite the relatively good stirring, small amounts of reatcion product are obtained with high viscosity. These can adhere to the walls of the stator and give rise to discoloration of the final product. Further, in some cases an uneven degree of sulphonation of the final product may be obtained. The said disadvantages can be encountered even if a relatively high gas flow rate is maintained throughout the entire process and are particularly noticeable in the case of more difficult sulphonation and/or sulphation processes, such as, for example, sulphonation and/or sulphation of fatty alcohols and certain ethylene oxide adducts thereof.

Ser. No. 408,624 provides an apparatus which is capable of imparting a rotating, axial and lateral, turbulent movement to the reaction mixture in that the movable cooling surface is given a rotating movement and is provided with members protruding in the space between the cooling surfaces so as to attain an intensified contact between the organic liquid and the sulphonation and/or sulphation medium and which increases the turbulence of the reaction mixture, thus improving the dispersion of the sulphonation and/or sulphation medium in the organic liquid. The said members, referred to as "protruding members," are so designed that the formed reaction products are passed on toward the outlet without remaining in the vicinity of the protruding members.

Because of the rotating, axial and lateral turbulent movement, it is possible to obtain an improved dispersion of the reaction mixture in the organic substance without impeding the movement of the reaction products towards the outlet opening, whereby local oversulphonation or oversulphation accompanied by discoloration of the reaction product is entirely avoided.

Ser. No. 408,624 discloses apparatus for carrying out the continuous sulphonating and/or sulphation process according to the invention having three suitable types of protruding members, viz cylindrical pegs (FIG. 2), conical pegs (FIG. 3) and flat, profilated, through-going members (FIG. 4), showing their arrangement on the movable cooling surface. The arrangement as shown in FIGS. 1 and 2 is characterized by a largely cylindrical drum 1, rotatable around its axis of symmetry and cooled on the inside, which is provided on the whole or major part of its outside with a number of projecting pegs 2 to cause turbulence in the medium surrounding the members upon rotation of the drum, by a stationary, outer cooling jacket 3 which surrounds the drum concentrically, inlets 4 and 5 for the sulphur trioxide gas mixture and the organic substance 5, respectively, outlet 6 for reaction product and residual gas mixture, inlet 7 and outlet 8 for cooling of the rotating drum, and inlet 9 and outlet 10 for cooling of the cooling jacket 3 surrounding the drum.

The protruding members can be designed in many different ways, but an indispensable condition is that they are so designed and positioned on the movable cooling surface that no so-called dead zones appear in their vicinity, where reacted product can remain in the form of lumps with a higher viscosity and thereby be oversulphonated or oversulphated, resulting in discoloration of and an uneven degree of sulphonation or sulphation in the final product. This is of particular importance in the sulphonation and/or sulphation of highly viscous, organic liquids. The protruding members must thus not put up any great resistance to the flow of the reaction mixture towards the outlet. They can, for instance, be made in the form of largely cylindrical or conical pegs or pins with a largely circular cross-section, which are affixed to the movable cooling surface at an appropriate distance from one another. The height of the pegs will naturally depend on the distance between the two cooling surfaces and on the speed of the moving cooling surface in relation to the stationary cooling surface. The height should be as great as the available space between the cooling surfaces, with due regard to what is permitted by the manufacturing tolerance. In this way, the formation of poor heat-conducting layers between the stationary cooling surface and the liquid-gas dispersion is avoided and the liquid turnover is increased.

The instant invention provides an improvement on the apparatus of Ser. No. 408,624 which makes it possible to maintain the sulphonation and/or sulphation degree in each period of the process at a preset optimum value, controlling this automatically by a control device actuated by the resistance to be overcome by the stirrer of the stirring device.

The present invention relates to an apparatus for sulphonating and/or sulphating alkyl compounds or alkylaryl compounds containing one or more hydroxyl groups and alkylene oxide adducts of said compounds or mixtures containing said substances, by reaction with gaseous sulphur trioxide in a discontinuous or continuous sulphonation and/or sulphation process. The apparatus is adapted for use both in sulphonation and sulphation processes and for reason of simplicity said processes will hereinafter be designated only by the term sulphonating processes.

For sulphonating and/or sulphating organic substances, for example fatty alcohols, fatty alcohol polyglycol ethers, alkylarylpolyglycol ethers a.s.o., in most cases chlorosulphonic acid, sulfuric acid or oleum is used as sulphonating agent. In such cases it constitutes a simple step to weigh in or determine volumetrically the components comprised and their mutual relationships. Neither the addition of too large nor of too small an amount of sulphonating agent has in these cases normally a detrimental effect on the final product. This applies above all to the employment of sulphuric acid and oleum which always are charged in a relatively great excess. When using sulphur trioxide as sulphonating and/or sulphating agent, however, the metering is rendered difficult, due to the fact, that a highly accurately determined amount of sulphur trioxide must be charged to a definite amount of substance to be sulphonated, and further because the sulphur trioxide in gaseous state is mixed with air or another inert gas. Sulphur trioxide as sulphonating agent has nevertheless, many advantages.

Sulphonation with sulphur trioxide usually is carried out with 2 to 8 mole percent in excess of the theoretically required amount of sulphur trioxide. This is called a sulphonation degree of 102 to 108 percent. The amount of added sulphur trioxide is critical. Too low a sulphonating degree results in a greater or smaller amount of unsulphonated matter which causes losses by non-response of sulphonated raw material in the production and may bring about undesirable side effects, for example turbidity, when the product is being applied. Too high a sulphonating degree gives rise to a substantial discolouring of the product caused by side reactions in the form of, for example, decomposition of the organic substance. As a result thereof, there will be raw material losses as well as a discoloured final product which is hard to bleech. Especially in such cases when alkylene oxide derivatives of fatty alcohols and alkyl phenols are sulphonated with sulphur trioxide, the product obtained shows foaming properties of a troublesome nature. As a consequence thereof, it has proved in many cases impossible to determine the sulphonation degree by means of any physical method, for example by measuring the changes in the viscosity, changes in the specific weight and the like, having reference to a higher or lower degree of sulphonation.

The present invention relates to apparatus for sulphonating and/or sulphating alkyl compounds and alkylaryl compounds containing one or more hydroxyl groups and alkylene oxide adducts thereof or mixtures containing the said substances, by reaction with gaseous sulphur trioxide. Said apparatus which does not show the aforesaid disadvantages is characterized in that it makes use of the conductivity of the sulphonated product for controlling the sulphonation degree, thereby preventing the foaming of the product from affecting the control operation.

The application of the apparatus according to the invention comprises, in principle, the steps of firstly separating the residual gases, for example in a cyclone, whereafter a device for measuring the conductivity of the liquid mixture of unsulphonated and sulphonated product obtained is arranged at a suitable point in the product flow discharged from the sulphonation reactor. The measuring impulse obtained is transmitted to a control device controlling the supply of the product to be sulphonated. For obtaining the optimum relationship between the conductivity determined and the degree of sulphonation, the said device is first calibrated for each substance to be sulphonated by determining the conductivity at varying amounts of added unsulphonated substance. Hereby a relationship between the conductivity determined and the sulphonation degree is obtained which may be illustrated graphically in the manner shown in FIGS. 1–3 referring to the examples. Therefrom the correct conductivity value for any desired sulphonation degree may be inferred—and, thus, the correct amount of unsulphonated substance to be added. The automatic control device maintains the conductivity during the process at a pre-set "reference" value. At any deviation from said value a signal is produced which affects the feeding of the unsulphonated substance.

The apparatus according to the invention renders it possible to feed the correct amount of unsulphonated substance during the entire sulphonation process, so that a constant sulphonation degree of a pre-set magnitude is obtained. The product resulting therefrom does not show discolouring. Thus, after-bleaching with sodium hypochlorite giving rise to chlorine-containing products, is prevented.

Products adapted to be subjected to sulphonation and/or sulphation according to the invention are alkyl compounds and alkylaryl compounds containing one or several hydroxyl groups or alkylene oxide adducts thereof. Also mixtures of the aforesaid compounds may be used. As examples may be mentioned alcohols containing 8 to 22 carbon atoms, fatty alcohols, fatty acids containing 8 to 22 carbon atoms, fats and fat oils and alkylphenols as well as ethylene oxide or propylene oxide adducts thereof, such as octanol, tridecyl alcohol, lauryl alcohol, stearyl alcohol, stearic acid, palmitic acid, tall oil fatty acid, castor oil, coconut fat, herring oil, octylphenol, nonylphenol, dinonylphenol, 2-butyl-4-nonylphenol, the reaction product of lauryl alcohol and 3 moles of ethylene oxide, and the reaction product of 1 mole of tridecyl alcohol and 2 moles of propylene oxide.

The conductivity of the sulphonated mixture may suitably be determined by conductivity measuring cells of known type which may be constructed substantially as measuring cells of the dip or flow type. Cells of the said type comprise substantially two platinum plates mounted in a definite spaced relationship. Across said plates an alternate current is applied and a measuring instrument is connected in the circuit.

The control device used for adjusting the supply of unsulphonated substance is constructed in such a manner, that it transforms the electric impulse—input signal—received from the conductivity measuring cell into an impulse controlling the supply of unsulphonated substance. This may occur, for example, such that the input signal in a transducer (signal transforming relay) is transformed into a pneumatic output signal of, for example, 3 to 15 p.s.i., adapted to control via a PID-regulator the amount of unsulphonated substance fed into the reactor by the metering pump. It is also possible to transmit the electric impulse received from the conductivity measuring cell to a relay adapted to actuate a motor value controlling the supply of unsulphonated substance to the reactor. As a further possibility, the electric impulse arriving from the conductivity measuring cell is transformed into a pneumatic output signal actuating a hydraulic regulator, for example of the Källe type.

The invention will be illustrated in greater detail in the following, reference being had to the accompanying drawings. FIGS. 1–3 are diagrams showing the relationship between sulphonation degree in percent and determined conductivity resistance in the sulphonation of different materials. FIG. 4 shows in a schematic way an apparatus for carrying out the process.

Example 1

The reactor employed (FIG. 4) comprises a substantially cylindrical closed reaction vessel or stator 1 provided with a cooling jacket 2 having inlet and outlet 3 and 4 for the cooling water, lower inlet 5 for a sulphur trioxide gas mixture, lower inlet 6 for organic substance, upper outlet 7 for the mixture of sulphonated and/or sulphated product and residual gas, and a substantially cylindrical cooled rotary stirrer or rotor 9 mounted concentrically with the reactor vessel, the shaft 10 of said stirrer located outside of the reaction vessel being connected with an electric drive motor 11. Affixed around the cylindrical rotor 9 are pegs 20, of the appearance shown in FIGURE 1 of the drawing. The space between the rotor 9 and the stator 1 serves as the reaction zone, and the ends of the pegs extend almost to the stator wall 1, so that they thoroughly and uniformly agitate the reaction mixture in the reaction zone, without obstructing flow of the reaction mixture from the inlet towards the outlet. A stream of tridecyl alcohol to which 4 moles of ethylene oxide per mole of tridecyl alcohol had been added was introduced through inlet 6. At 5 a stream of gaseous $SO_3$ in the form of a $SO_3$-air mixture containing 6 percent by volume of $SO_3$ was supplied. By a cyclone 12 the product discharged from the reactor was separated from the residual gas. In the product flow after the cylone a conductivity measuring cell 13 was placed and combined with a temperature compensator. By reading the resistance and at the same time determining the sulphation degree by titration with 0.1 N NaOH the diagram in FIG. 1 was obtained which shows the relationship between the determined resistance and the sulphation degree. By employing a receiving instrument 14 which via a PID-regulator 15 gave control signals to the valve 16 for adjusting the supply of the tridecylalcohol polyglycol ether, and by setting the "reference" value at 0.24 megohm, a constant sulphation degree of 102 percent was maintained. The product resulting therefrom was free of discolouring and showed a colour of 4 Gardner in 28% aqueous solution neutralized with sodium hydroxide.

Example 2

For this experiment the same test apparatus was used as in Example 1, but instead of tridecylalcohol polyglycol ether an industrial lauryl alcohol was added. The determination of the relationship between the sulphation degree and the determined conductivity resistance was carried out in the same manner as in Example 1. The relationship obtained is shown in FIG. 2. By setting the "reference" value of the regulator at 9.5 kiloohms a constant sulphation degree of 104 percent was maintained. The product resulting therefrom was free of discolouring and showed a colour of 3 Gardner in 15% aqueous solution neutralized with sodium hydroxide.

Example 3

For this experiment the same test apparatus was used as in Example 1, but instead of tridecylalcohol polyglycol ether a laurylalcohol polyglycol ether prepared from industrial laurylalcohol and obtained by reacting 1 mole of lauryl alcohol with 3 moles of ethylene oxide was added. The relationship between the sulphation degree and the determined conductivity resistance was determined as in Examule 1. The relationship obtained appears from FIG. 3. By setting the "reference" value of the regulator at 0.30 megohm a constant sulphation degree of 105 percent was maintained.

The applicability of the invention is not restricted to the abovedescribed sulphonation examples. The invention may be used for maintaining a constant sulphonation degree in continuous sulphonation and/or sulphation processes as well as for giving signals for the interruption of discontinuous sulphonation and/or sulphation processes when the desired sulphonation degree is achieved.

I claim:
1. Apparatus for the continuous sulphonation and/or sulphation of liquid organic compounds with a stoichiometric excess of gaseous sulphur trioxide-inert gas mixtures, permitting control of the sulphonation or sulphation degree by measurement of the conductivity of the reaction mixture and adjusting the rate of feed of the organic compound accordingly, and thus facilitating the obtention of a light colored product having a low proportion of salt, after neutralization, and a low proportion of unsulphonated and/or unsulphated material, comprising, in combination, a substantailly cylindrical stator; a substantially cylindrical rotor, concentrically and rotatably mounted within the stator, spaced from the inner wall thereof, and defining an annular reaction zone therebetween within which can be disposed a sulphonation and/or sulphation reaction mixture; means for rotating the rotor; means disposed within the rotor for cooling the rotor surface; a stationary outer cooling means surrounding the stator; means for circulating a cooling fluid through each cooling means, and means for controlling the temperature of the cooling fluids to maintain a reaction mixture within the reaction zone at a reaction temperature; and a plurality of projecting members disposed on the outer surface of the rotor, so designed and positioned thereon that when the rotor is rotated, the protruding members uniformly agitate a reaction mixture disposed in the reaction zone, with substantially no dead zones therein; an inlet for the introduction of organic substance to be sulphonated and/or sulphated to the reaction zone; an inlet spaced therefrom for the introduction of sulfur trioxide-inert gas mixture into the same zone; an outlet for the withdrawal of unreacted gases and reaction mixture from the said zone; means for measuring the conductivity of a reaction mixture withdrawn from the reaction zone, and control means operatively connected to the measuring means and responsive to signals from the measuring means within a predetermined range correlating conductivity and degree of sulphonation to control the rate of the organic compound fed to the reaction zone, and thereby control the sulphonation or sulphation degree of the reaction mixture within said predetermined range, according to codnductivity.

2. Apparatus in accordance with claim 1 in which the means for measuring conductivity is an electrical conductivity measuring cell.

3. Apparatus in accordance with claim 1 including a transducer to actuate the control means, responsive to a change in the conductivity of the reaction mixture.

4. Apparatus according to claim 3 in which the transducer is a signal transforming relay adapted to transform an electric impulse received from the conductivity measuring means into a pneumatic signal, and the control means is a regulator actuated by the output signal of the signal transforming relay, to send a corresponding signal to a metering pump in communication with organic compound of the inlet and controlling the amount of organic compound fed to the reaction zone through that inlet.

5. Apparatus according to claim 3 in which the transducer is a signal transforming relay adapted to transform an electrical impulse received from the conductivity measuring means into a pneumatic signal, and the control means is a motor valve actuated by the relay and controlling the amount of organic substance fed to the reaction zone.

6. An apparatus according to claim 3 in which the transducer is a signal transforming relay adapted to transform an electrical impulse received from the conductivity measuring means into a pneumatic output signal, and the control means is a hydraulic regulator actuated by the pneumatic output signal of the signal transforming relay and controlling the amount of organic compound added to the reaction zone.

References Cited

UNITED STATES PATENTS

| | | | |
|---|---|---|---|
| 1,450,023 | 3/1923 | Edelman | 23—230 XR |
| 2,129,896 | 9/1938 | Whiteman | 260—400 |
| 3,350,428 | 10/1967 | Brooks et al. | 260—460 XR |

OTHER REFERENCES

Ekman, "Automatic Process Control," pp. 195–208, John Wiley & Sons, Inc. Copyright 1958.

JAMES H. TAYMAN, Jr., *Primary Examiner.*

U.S. Cl. X.R.

23—253, 260; 260—400, 459, 504, 505, 686, 698; 165—92; 137—5, 93; 324—30, 65

UNITED STATES PATENT OFFICE
CERTIFICATE OF CORRECTION

Patent No. 3,438,744                                                                  April 15, 196

Olof Steijner

It is certified that error appears in the above identified patent and that said Letters Patent are hereby corrected as shown below:

Column 1, line 28, "application" should read -- applicant --; line 43, "a said" should read -- as a --; line 54, "reatcion" should read -- reaction · Column 3, line 53, "bleech" should read -- bleach --. Column 5, line 33, "cylone" should read -- cyclone --; line 70, "Examule" should read -- Example --. Column 6, line 17, "substantailly" should read -- substantially --; line 48, "codnuctivity" should read -- conductivity --; line 62, "of", first occurrence, should read -- at --. Column 7, after line 10, insert:

| | | | |
|---|---|---|---|
| 3,198,849 | 8/1965 | Ballestra -------------- | 23-253 X |
| 2,448,042 | 8/1948 | Miller ----------------- | 259-7 |
| 2,438,852 | 3/1948 | Goldsby et al. --------- | 23-285 X |
| 1,530,833 | 2/1925 | Keeler ----------------- | 23-253 X |
| 1,036,628 | 9/1912 | Humphreys -------------- | 165-92 |

Signed and sealed this 14th day of April 1970.

(SEAL)
Attest:

EDWARD M. FLETCHER, JR.                                            WILLIAM E. SCHUYLER, JR.
Attesting Officer                                                           Commissioner of Patents